United States Patent [19]

Barbieri

[11] Patent Number: 4,903,780

[45] Date of Patent: Feb. 27, 1990

[54] MOBILE, SELF-PROPELLED CRUSHING MACHINE

[76] Inventor: Elda Barbieri, 31 Via Pasubio, 36030 Villaverla (Vincenza), Italy

[21] Appl. No.: 72,101

[22] Filed: Jul. 10, 1987

[30] Foreign Application Priority Data

Jul. 11, 1986 [IT] Italy ................................ 85576 A/86

[51] Int. Cl.[4] ................................................ A01B 33/02

[52] U.S. Cl. ...................................... 172/122; 172/483; 172/430; 172/45; 172/549; 172/108

[58] Field of Search .................. 172/45, 483, 484, 101, 172/125, 108, 548, 549, 122, 76, 77, 109, 430

[56] References Cited

U.S. PATENT DOCUMENTS

| | | | |
|---|---|---|---|
| 1,133,956 | 3/1915 | Harris | 172/483 |
| 1,371,571 | 3/1921 | Pettman | 172/122 |
| 1,644,583 | 10/1927 | Hargrave | 172/483 |
| 1,733,153 | 10/1929 | Hagglund | 172/483 |
| 1,823,305 | 9/1931 | Wells | 172/483 |
| 1,862,035 | 6/1932 | Rainwater | 172/483 |
| 1,903,124 | 3/1933 | Miller et al. | 172/430 |
| 2,306,983 | 12/1942 | Schutte et al. | 241/197 |
| 2,606,011 | 8/1952 | Lommen | 172/45 |
| 2,959,201 | 11/1960 | Tourneau | 172/122 |
| 3,678,885 | 7/1972 | Ferguson | 172/430 |
| 3,767,264 | 10/1973 | Eckey | 172/122 |
| 3,889,759 | 6/1975 | Larson | 172/438 |
| 4,043,042 | 8/1977 | Perfect | 128/215 |
| 4,043,402 | 8/1977 | Nelson | 172/112 |
| 4,044,841 | 8/1977 | Smith et al. | 172/122 |
| 4,333,686 | 6/1982 | Arnswald | 51/176 |
| 4,409,910 | 10/1983 | Hoyle et al. | 172/45 |
| 4,599,034 | 7/1986 | Kennedy et al. | 267/71 |

FOREIGN PATENT DOCUMENTS

| | | | |
|---|---|---|---|
| 48793 | 5/1934 | Denmark | 172/548 |
| 0127587 | 12/1984 | European Pat. Off. . | |
| 2209743 | 9/1973 | Fed. Rep. of Germany . | |
| 3318737 | 11/1984 | Fed. Rep. of Germany . | |
| 608994 | 4/1926 | France . | |
| 178037 | 11/1982 | Japan | 172/430 |
| 120967 | 10/1958 | U.S.S.R. | 172/45 |

*Primary Examiner*—Deborah L. Kyle
*Assistant Examiner*—Stephen Johnson
*Attorney, Agent, or Firm*—Birch, Stewart, Kolasch & Birch

[57] ABSTRACT

A mobile, self-propelling crushing machine includes a structure essentially consisting of two beams, on which a central frame is welded. The central frame houses a rotor which is supported on a frame, which, in one form, is lowered by hydraulic cylinders fixed to the frame. In another form, the frame is lowered by four mechanical jacks being driven by a single hydraulic motor. Thus, the penetration of the rotor into the soil to be treated does not depend only on its own weight, but especially on the action of the just-mentioned hydraulic cylinders or mechanic jacks. The rotor is driven by two hydraulic motors which are opposite to one another and which are self-adjusting so that when a pressure transducer signals a pressure increase to the hydraulic motors of the rotor due to an increased effort, the forward movement speed of the machine, which moves on tracks, decreases as a consequence.

13 Claims, 6 Drawing Sheets

FIG. 4
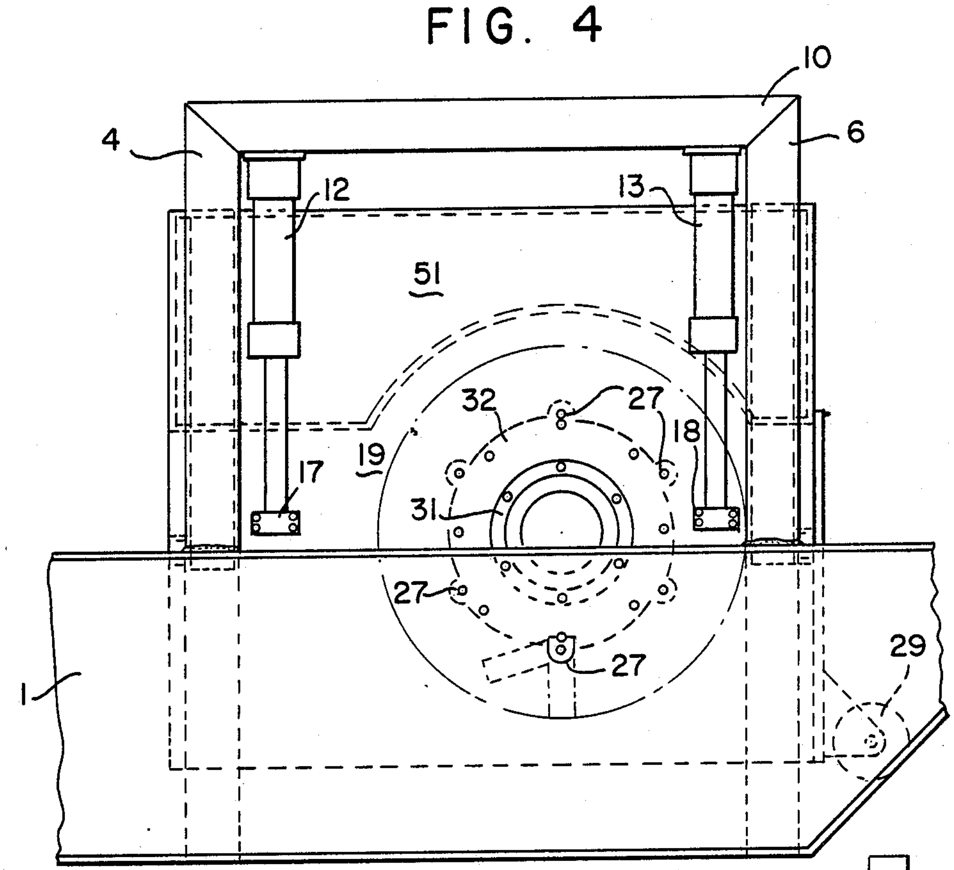
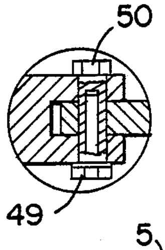
FIG. 5B
FIG. 7
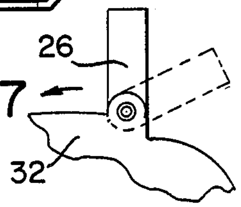
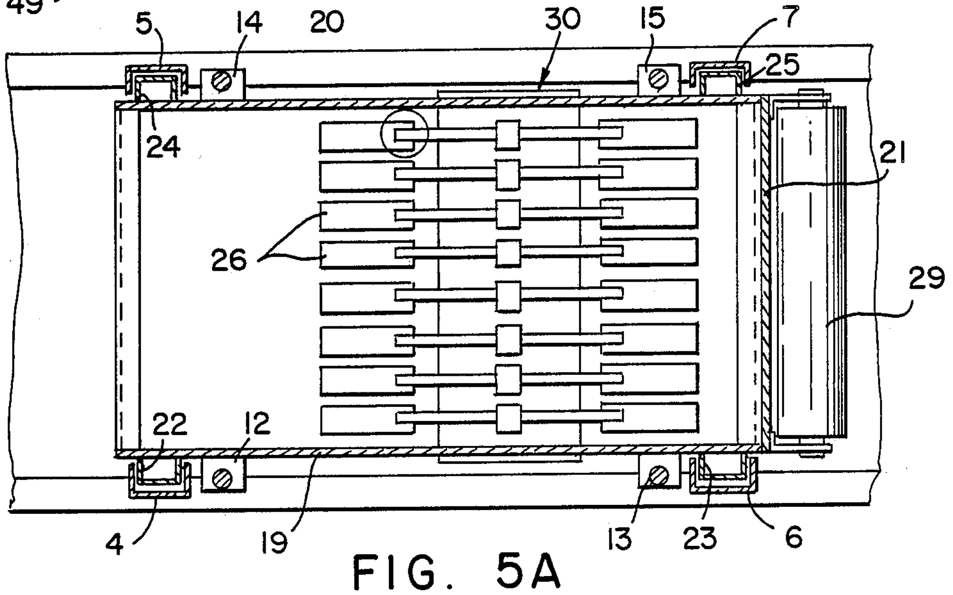
FIG. 5A

MOBILE, SELF-PROPELLED CRUSHING MACHINE

The invention concerns a mobile, self-propelled crushing machine suited for the treatment and the land reclamation of rocky soils, as well as for the cultivation of open-pit mines and for the preparation of road beds.

Some types of known crushing machines, mostly of the trailer type, have the rotor bearing a series of crushing hammers driven by a power-take-off connected, for instance, to an agricultural tractor.

Some types of crushing machines are provided with their own motor and power is conveyed to the rotor by means of the mechanical pulley/belt system.

The penetration of the rotor into the soil to be treated depends not only on the kinetic energy of the hammers, but also on the lowering of the rotor itself in relation to the plane of the machine, as well as on the power applied by the rotor to the soil being treated.

In one type of known crushing machine the lowering of the rotor in relation to the plane of the machine is obtained by means of some hydraulic jacks positioned between the axle of the trailing wheels of the machine and the frame. These hydraulic hammers cause the rotation of two hinged arms, which connect the wheel axle and the frame, with the effect of lifting or lowering the frame bearing the rotor and, therefore, the rotor itself.

As far as the pressure of the rotor on the soil is concerned, it depends exclusively on the weight of the rotor. One of the disadvantages which are found in the just mentioned machines is that the penetration of the rotor into the soil is rather limited, since said pressure depends exclusively on the weight of the rotor. Besides, even the lowering of the rotor in relation to the plane of the machine is, in fact, rather limited by the type of articulation, that is of the rotation of the hinged arms.

Another limitation of the known machines consists in the fact that the power transmission to the rotor, which is obtained by means of a transmission belt being placed laterally in relation to the rotor supports, causes some inconveniences to the supporting bearings because of the different load applied to the bearings themselves.

SUMMARY OF THE INVENTION

The main purpose of the present invention is that of eliminating the now mentioned disadvantages by realizing a crushing machine being suited to treat soils which are extremely difficult, because of the presence of large, even protruding boulders and even because of the conformation of the soil with steep slopes, for instance with 30–35% inclines.

In particular, one purpose is to easily adjust the depth of penetration into the soil according to the requirements. Yet another purpose is that the pressure of the rotor on the soil depends not only on its own weight, but also on an adjustable strength applied by the machine operator. Another purpose is that the transmission of the rotor rotation insures a perfect balance to the bearings supporting it, in order to do away as much as possible with the maintenance operations.

We also want to obtain self adjustment of the effort of the machine during the crushing operation, in the sense that a slowing down of the machine moving speed automatically corresponds to an increased crushing effort.

The last, but not the least, purpose which we want to obtain is that the fastening of the hammers to the supporting flanges of the rotor be of a simple type, so as to allow an easy replacement of the hammers.

Besides, we want the crushing machine to be stable under practically any working condition, even or very uneven and steep soils with very strong inclines.

All the just-mentioned purposes and others, which will be better illustrated hereafter, are achieved with the realization of a crushing machine of the self-propelled type, including a supporting frame, preferably mounted on tracks and consisting essentially of two longitudinal parallel beams, connected with each other, which support a single central frame, housing the rotor which is provided with hammers, said machine being characterized by the fact that the rotor is made to penetrate into the soil by lowering itself in the orthogonal direction in relation to the frame, said movement being caused by the synchronous pushing action exerted by means placed on the frame of the crushing machine, which are arranged at least in each of the corners of the rotor supporting frame, further characterized by the fact that the rotor is driven by two opposite hydraulic motors acting in the axial direction and having their axes coinciding with the rotor axle.

According to a preferred form of construction of the machine being the object of the invention, the synchronous pushing action on the rotor is exerted by at least four hydraulic cylinders, vertically mounted on the frame of the machine and connected with the lateral metal plates supporting the rotor.

According to another form of execution of the invention, the pushing action on the rotor is exerted by four mechanical jacks, each acting on a screw, which, while rotating, cause the corresponding bushings, which are rigidly connected with the rotor supporting frame, to slide vertically.

One of the advantages of the invention consists in the fact that the lowering of the rotor in a direction which is constantly orthogonal in relation to the machine frame, guarantees an even treatment of the soil and an equally even wearing out of the hammers.

Another advantage of the machine according to the invention is that the strength of the rotor penetration into the soil no longer depends on the weight of the rotor itself, but is the main function of the pushing strength exerted against the soil by the pressure means being present on the machine frame. Yet another advantage of the machine according to the invention consists in the fact that the two hydraulic motors activating the rotation of the rotor are foreseen and that they are placed one opposite the other within the housing containing the rotor, so that they are protected during the treatment of the soil and so that the penetration of the rotor into the soil occurs without any hindrance on the part of the motors. Besides, thanks to this arrangement of the motors, the working width, which corresponds to the width of the rotor, practically coincides also with the overall width of the crushing machine.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

Other characteristics and details of the invention will be better understood from the description of a preferred form of execution of the crushing machine, which is given by way of example only, but is not meant to limit the scope of the invention and which is illustrated in the enclosed figures, wherein:

FIG. 4 shows in a lengthwise section the arrangement of the rotor and of its frame in relation to the structure supporting the machine;

FIG. 5*a* is a horizontal section of the machine which shows the arrangement of the rotor hammers;

FIG. 5*b* is a sectional view of FIG. 5*a* taken from the encircled area showing the fastening of the hammers to the flange;

FIG. 7 shows the shape of the profile of the flange bearing the hammers;

DETAILED DESCRIPTION OF THE PREFERRED EMBODIMENTS

Figure 3:
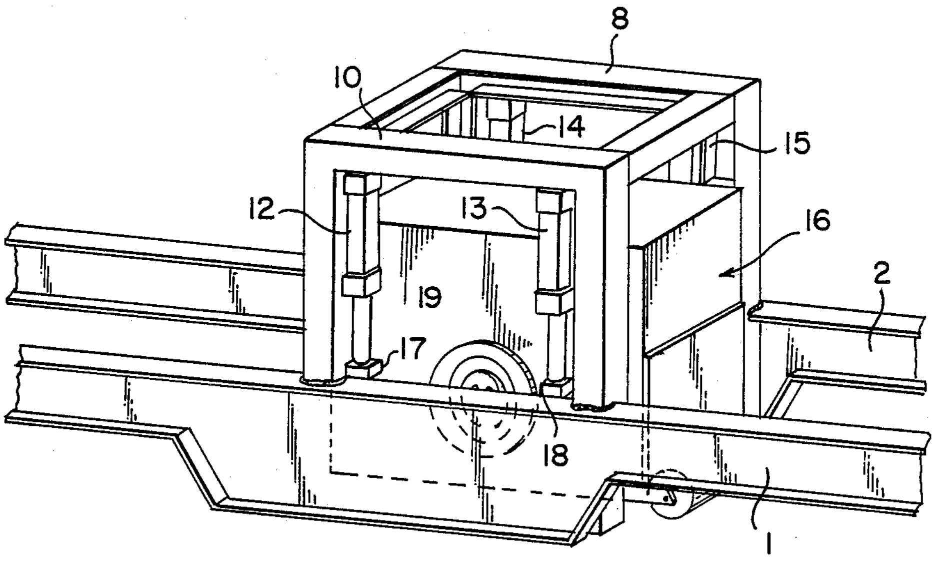
FIG. 3 shows a view of the frame supporting the rotor being connected to the central frame by means of hydraulic cylinders.

With reference to the above-mentioned figures, it can be observed that the crushing machine includes a supporting structure consisting essentially of two longitudinal parallel beams 1 and 2 of the I-type with an increased section in their central position corresponding to where frame 3, having the form of a parallelepiped, is positioned. Said frame consists of four vertical posts 4, 5, 6, 7 having a "U" shape and being welded to the main beams 1 and 2 and of four more transverse upper beams 8, 9, 10, 11, being also in a "U" shape and being welded to each other and to the vertical posts. Four hydraulic cylinders are directly connected to two of the four upper transverse beams, as can be observed in FIG. 3. Thus, the cylinders 12 an 13 are connected to beam 10 and the cylinders 14 and 15 are connected to beam 8. Since the rods of said hydraulic cylinders are connected to the lateral sides of the supporting frame of the rotor being indicated as a whole with 16, it follows, as a consequence, that both the frame and the rotor are in fact supported by the four hydraulic cylinders. In fact, as can be observed in the FIGS. 3 and 4, the rods of the cylinders 12 and 13, which can be seen in said figures, are connected to the brackets 17 and 18 being welded to the lateral side 19 of frame 16. It is thus easy to understand how the whole frame 16 and, therefore, also the rotor supported by said frame, can penetrate into the soil at a prestabilized depth, which is the result of the stroke of the pistons of the hydraulic cylinders; it can also be understood how the power of the rotor pressure in the soil depends, not only on the weight of the rotor and of the supporting structure, but also in a determinant way on the hydraulic push exerted by the cylinders on the rotor frame.

Figure 6:
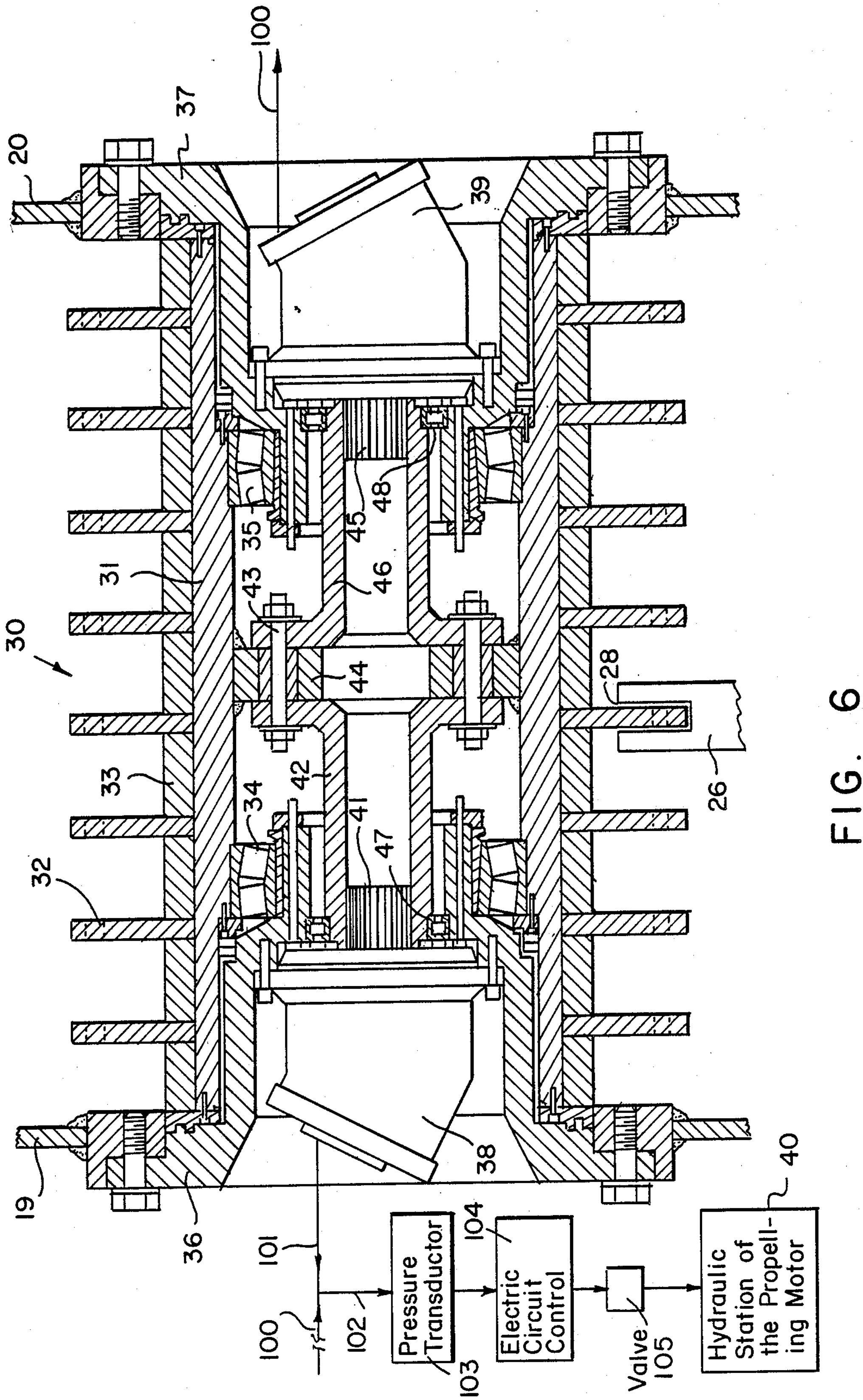
FIG. 6 is a sectional view of the rotor of the crushing machine.

As can be observed in FIG. 5, the rotor frame 16 consists of two lateral metal sheets 19 an 20 and of a back metal sheet 21. The lateral sheets 19 an 20 are not only supported by the hydraulic cylinders 12, 13, 14 and 15, but they are also guided within the vertical posts by U-shaped slides, which are welded to the sheets 19 and 20 and inserted into the posts. Thus the slides 22 and 23 are inserted into the posts 4 and 6 and 24 and 25 are inserted into the posts 5 and 7 respectively. FIG. 6 shows the rotor of the crushing machine, which is indicated as a whole with 30 and which consists of cylinder 31 on the surface of which a series of circular flanges 32, being equally spaced from each other by spacing rings 33, is arranged. The hammers 26 which crush the rocks are fastened to the flanges 32. The cylinder is supported by two roller bearings 34 and 35, which are connected to two flanges 36 and 37. Each of said flanges, which is bolted to the lateral side of frame 16 by means of bolts, is shaped in such a way that it receives and bears a hydraulic motor. In the case being examined, flange 36 bears motor 38 and flange 37 bears the hydraulic motor 39. The bulk of the hydraulic motors 38 and 39 are contained within the hollow spaces constituted by the flanges 36 and 37, respectively. Thus, rotor 30 can sink into the soil to be treated without any problems from the hydraulic motors. It can be said, in actuality, that the track opened in the soil by the rotor hammers is as wide as the maximum distance between the two opposite motors 38 and 39, so that the rotor can penetrate deeply into the soil without any hindrance.

Shaft 41 of the hydraulic motor 38 is coupled with the flanged half-joint 42, which is fastened by means of the bolts 43 to the round crown 44, which is welded to cylinder 31 of rotor 30. In the same way, shaft 45 of the hydraulic motor 39 is coupled with the flanged half-joint 46, which is also fastened to the round crown 44. Between the flanges and the half-joints there are two bearings which have the task of centering and supporting the half-joints. Thus, bearing 47 is connected between flange 36 and the half-joint 42 while bearing 48 is connected between flange 37 and the half-joint 46.

The opposite arrangement of the two hydraulic motors 38 and 39 insures a balanced distribution of the efforts of the rotor and it allows, therefore, a practically uniform load on the bearings.

As a consequence, a longer life span is insured to all the bearings of the rotor and to all the parts connected to them. The speed of the rotor is directly proportional to the pressure exerted by the fluid which runs the hydraulic motors, while the issuing power is proportional to the amount of the fluid itself.

These parameters are variable with the help of known control devices which act on the pumps of the hydraulic pack 40, which is present on board the crushing machine. In the case of the described example, the propelling motor of the self-propelled machine is of the hydraulic type too and this allows a direct self adjustment of the forward-motion speed of the machine in relation to the power absorbed by the rotor during the crushing operation. For this reason it has been planned that the hydraulic circuits 100, 101, and 102, which are connected to the motors 38 and 39 of the rotor, be provided with a pressure transducer 103 which reads the pressure of the circuit and sends a proportional electric signal to a balancing electronic circuit 104. The circuit controls a valve 105 acting on the flow adjuster, so as to lower the amount of liquid converging to the propelling motor, with the consequent decrease of the forward-motion speed, when the transducer signals a pressure increase.

On the other hand, if the transducer signals a decrease of pressure, due for instance to the presence of only a few obstacles in the soil, then there will be an adjustment in the sense that the delivery to the machine-propelling motor is increased, and, as a consequence, the speed of the machine will increase. With reference to FIG. 4, it can be observed that, in the case under examination, the flanges 32 of the rotor are provided with six fastening points for the hammers; said points are indicated with 27.

The flanges being provided with six fastening points for the hammers, it is possible to mount a single hammer with a counterweight on the opposite side, or two opposite hammers. All this is done according to the nature of the soil to be treated and also to the speed at which one wants to perform the treatment. Hammer 26 is a prism-shaped metal block having a passing slot 28, as can be observed in FIG. 6.

The shape of flange 32 is such, that the rim of said flange presents a smaller diameter on one side of the hammer than on the other side of it, so that the hammer can position itself at an angle in the direction opposite to the direction of rotation of the rotor, as can be seen in FIG. 7, thus avoiding the breaking up of the hammer when it hits rocks that are too hard. The fastening of the hammers to the flange is achieved by means of a bolt 49 which engages itself in a threaded bushing 50 having the same length. The length of both the bolt and the bushing is such, that it is possible to remove the two mechanical parts from hole 27 without hindering the adjoining hammer.

This fact is particularly important if one considers that the replacement of worn-out hammers is very frequently necessary and it is, therefore, necessary that this operation be done easily and with the least employment of labor, which goal is, in fact, achieved with the just described fastening method.

Figure 1:
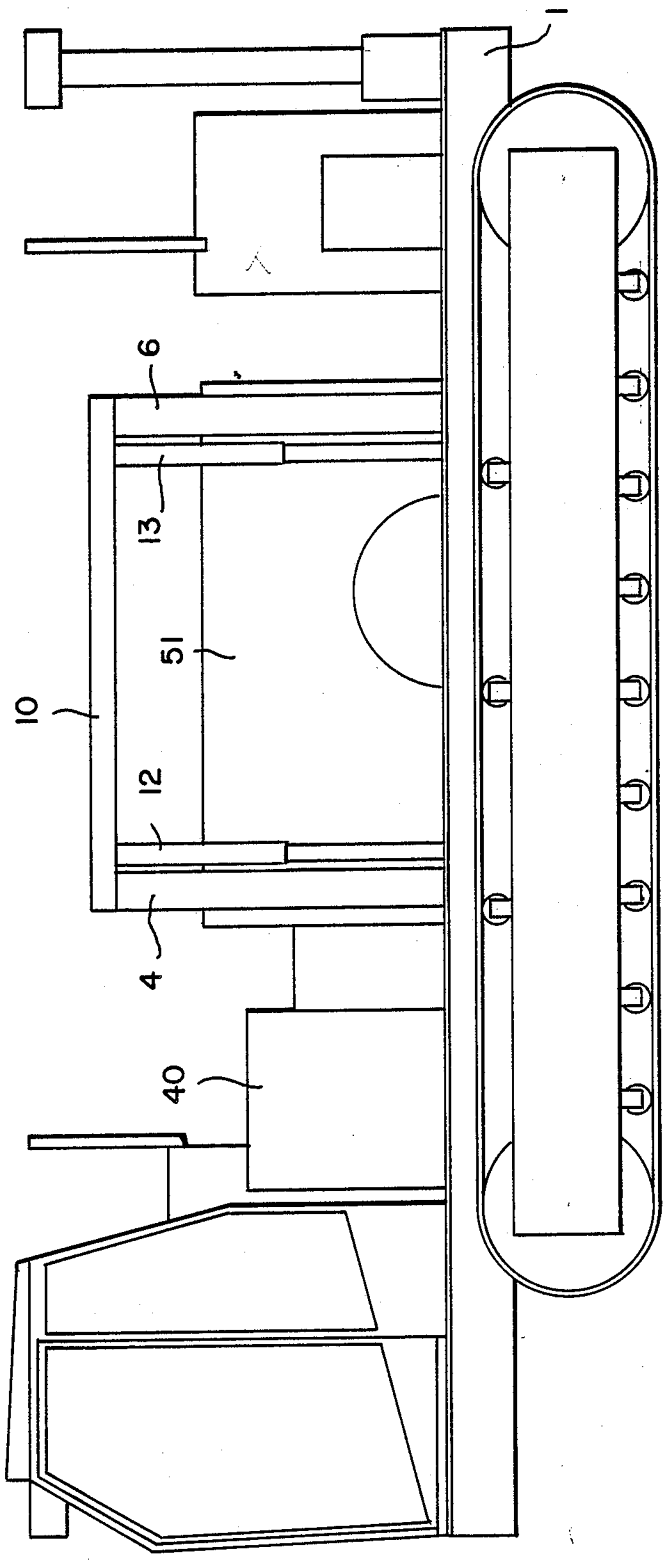
FIG. 1 shows a side view of the crushing machine as a whole.
Figure 2:
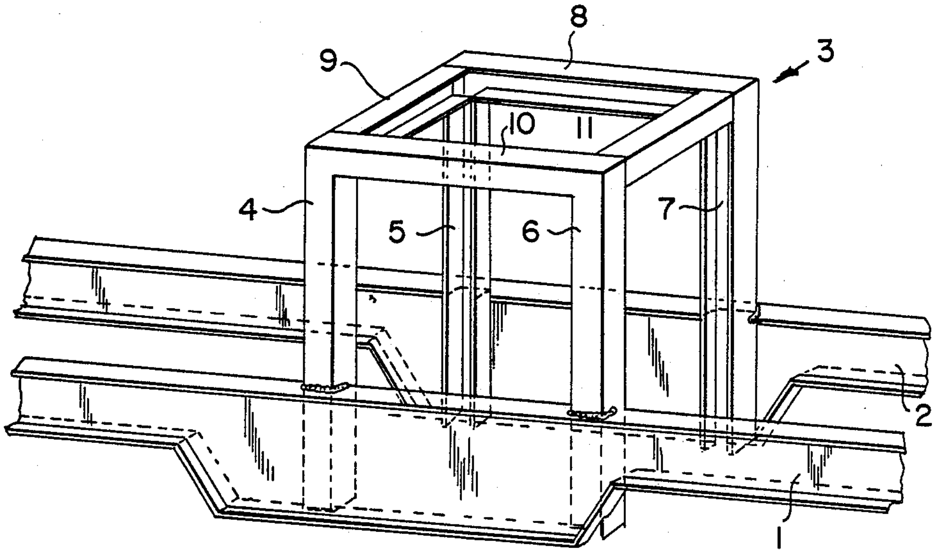
FIG. 2 is a perspective view of a part of the supporting frame and of the central frame.

Finally, in order to increase the stability of the machine and the weight loading down the rotor during the crushing operation, it has been deemed advisable—in the example of FIG. 1—to place the fuel tank 51 directly on the rotor frame 16 and precisely over the rotor itself, as can be seen in FIG. 4. Moreover, at the bottom of the metal sheet 21 of frame 16 the presence of a levelling roller 29 has been foreseen, which is meant to level the soil after it has been treated by the machine.

Figure 8:
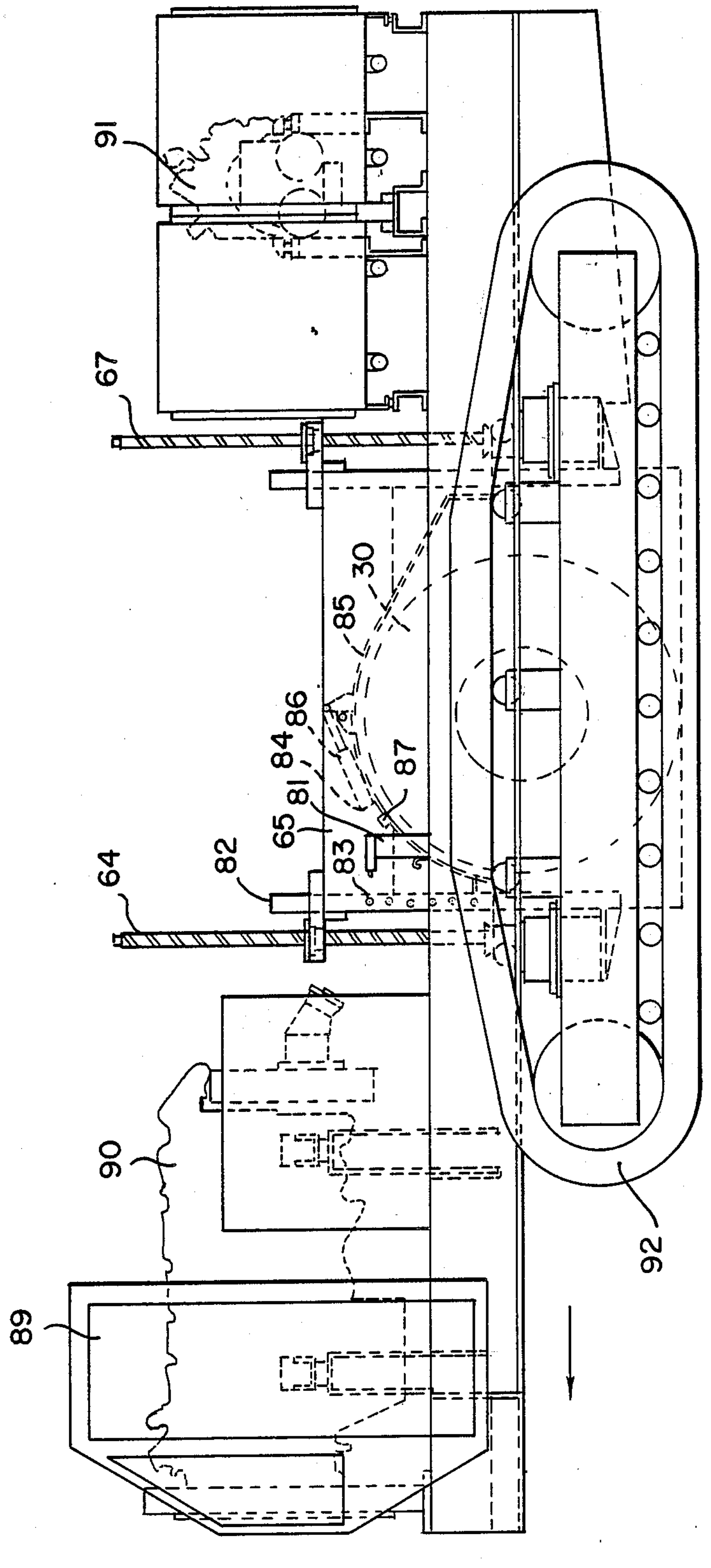
FIG. 8 is a side view of a construction variation of the crushing machine.
Figure 9:
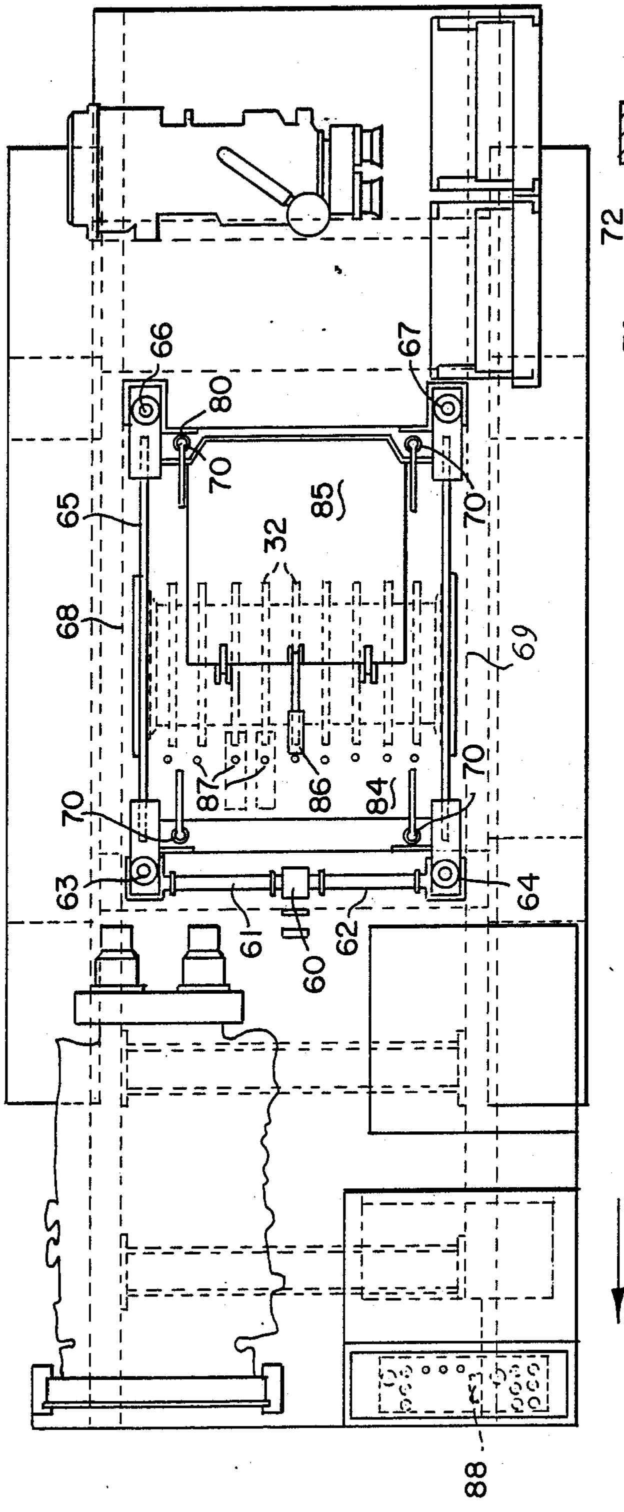
FIG. 9 is a top view of the variation of FIG. 8.
Figure 10:
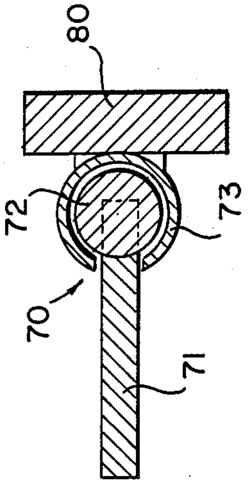
FIG. 10 shows in detail the guide of the rotor frame.

The FIGS. 8, 9 and 10 represent a different form of execution of the machine being the object of the invention. In this form of execution the lowering and lifting movement of rotor 30 is not obtained by means of four hydraulic cylinders, but rather by means of four mechanical jacks, which are positioned at the corners of the rotor-supporting frame. A single hydraulic motor 60 causes two coaxial half-joints 61 and 62, being connected at the opposite sides of gear boxes, to rotate. The heads of said gears cause the vertical screws 63 and 64 respectively to turn. Each of the screws 63 and 64 is coupled with a lock nut, and the lock nut, in turn, is rigidly connected with frame 65 supporting rotor 30. The gear boxes activating the other two screws 66 and 67 of the remaining mechanical jacks are driven by chain 68 for screw 66 and chain 69 for screw 67. Therefore, chain 68 connects the gear boxes of the screws 63 and 66, while chain 69 connects the gear boxes of the screws 64 and 67. The result of this is that all four screws of the jacks rotate by the same angle and, as a consequence, the four lock nuts, which are connected with said screws are subject to a translation motion of the same nature, thus insuring an even treatment of the underlying soil.

Frame 65 supporting rotor 30 is guided at its four corners by means of two coaxial tubes, coupled together. More precisely, as can be seen in FIG. 10, where the enlarged detail of the guide assembly 70 is shown, a metal plate 71 is welded to frame 65 supporting the rotor and it presents a tube 72 welded at its end. Another tube 73 presents a lengthwise slot, in order to allow the sliding of plate 71 and it is fixed by means of plate 80 to the frame of the machine.

Clearly, when rotor 30 goes up or down in relation to the frame of the machine, frame 65, and therefore the rotor too, is guided within the four tube-shaped posts 72, which slide within a corresponding number of posts 73.

The relative position between the rotor and the frame of the self-propelled machine is detected by a closeness sensor 81, which reads the position of the rotor in relation to a scale 82, which is marked with reference dots 83.

Rotor 30 is closed at the top by a protection plate, presenting a fixed part 84 and a mobile part 85, which can be lifted by means of a pneumatic cylinder 86.

This insures the possibility of inspecting the rotor from the upper part of the machine and it is also possible to easily replace the worn-out hammers.

On this subject it will be pointed out now that the machine being the object of the invention is provided, in both the illustrated forms of execution, with closeness sensors, which signal the wearing out of the hammers and trigger a signal in the driver's cab when the hammers are worn out beyond a certain size.

In the FIGS. 8 and 9, it can be observed that the sensors 87 are mounted on plate 84 and each of them is arranged in relation to each round flange 32 of rotor 30. Thus, if one of the hammers connected with one of the flanges 32 wears out or breaks, sensor 87 detects the trouble and sends a signal to the control panel 88 in the cab 89.

It will be finally pointed out that the execution form illustrated in the FIGS. 8 and 9 foresees two separate endothermic motors which separately drive the progress of the machine and the movement of the rotor.

More specifically, motor 90 drives the hydraulic motors of rotor 30 and motor 60 driving the mechanic jacks; while motor 91, being less powerful, as compared with motor 90, drives the movement of the machine tracks 92.

Several construction variations may be applied during the manufacturing of the machine; said variations will be considered within the scope of the present invention, such as it is defined in the following claims.

I claim:

1. A mobile, self-propelled crushing machine comprising:

a support structure having two longitudinal, generally parallel beams supporting a central frame, said central frame having at least four corners;

a rotor housed within the central frame, said rotor having a cylindrical member;

means for moving the rotor generally orthogonally to the generally parallel beams in order to move the rotor away from ground beneath the crushing machine and toward and into the ground, said means for moving being positioned at least at each of the four corners of the central frame;

a series of flanges and spacers provided on the rotor, said flanges being separated from one another by the spacers;

hammers detachably affixed to the flanges on the rotor; and means for rotating the rotor, said means for rotating being operatively connected to and located within the rotor.

2. The crushing machine as recited in claim 1, wherein said means for rotating comprises at least two hydraulic motors positioned within the cylindrical member of the rotor at opposite ends thereof, each of said motors having a shaft extending therefrom inside said cylindrical member, said means for rotating further comprises a half-joint operatively connected to each of said shafts and a round crown positioned centrally within said cylindrical member, said half-joints each being operatively connected to said round crown.

3. The crushing machine as recited in claim 2, wherein said cylindrical member has a cylindrical member flange positioned adjacent each end thereof, each of said cylindrical member flanges being attached to a support frame, the support frame being held by said means for moving, each of said cylindrical member flanges being operatively connected to said rotor by at least one pair of bearings, each of said cylindrical member flanges further having a second pair of bearings supporting the half-joint whereby said rotor is supported on the central frame by said cylindrical member flanges.

4. The crushing machine as recited in claim 1, wherein said means for moving comprises at least four hydraulic cylinders, and further comprising a support frame for holding the rotor, said hydraulic cylinders extending from one of the four corners of the central frame to the support frame, said hydraulic cylinders being simultaneously operable to raise and lower the support frame with the rotor.

5. The crushing machine as recited in claim 1, wherein said means for moving comprises at least four mechanical jacks and further comprising a support frame for holding the rotor, said mechanical jacks extending from one of the four corners of the central frame to the support frame, said mechanical jacks being interconnected by chains and being simultaneously operable by a single motor through said chains whereby the support frame with rotor can be raised and lowered.

6. The crushing machine as recited in claim 5, wherein each of the mechanical jacks has a screw thereon and said support frame has a lock nut to correspond to each of the screws.

7. The crushing machine as recited in claim 1, further comprising a support frame for holding the rotor and a closeness sensor means for determining and controlling a position of the rotor, said closeness sensor means comprises a scale with a series of dots fixed relative to said support structure and a sensor device attached to said support frame.

8. The crushing machine as recited in claim 1, further comprising sensor means for detecting wear and tear of the hammers, said sensor means having sensors which are positioned above said rotor.

9. The crushing machine as recited in claim 1, wherein said flanges are generally equidistantly positioned around the cylindrical member such that hammers can be evenly distributed around the rotor, said flanges each having two sides with one side having a smaller diameter, the hammers being pivotally attached to the flanges whereby said hammers can move toward the side of the flange having a smaller diameter, said side of the flanges with a smaller diameter being on a rearward side whereby said hammers pivot in a direction opposite to a direction in which said means for rotating rotates the rotor.

10. The crushing machine as recited in claim 1, further comprising bolts for fastening the hammers to the flanges, said bolts being engageable in a threaded bush on the flange and having a length which is less than a space between the flanges formed by said spacers, whereby said bolts can be removed from a flange without disturbing a neighboring flange.

11. The crushing machine as recited in claim 1, further comprising a propelling hydraulic motor for driving the crushing machine and wherein said means for rotating comprises a hydraulic motor.

12. The crushing machine as recited in claim 11, further comprising an adjustment circuit interconnecting the hydraulic motors and a pressure transducer and electronic circuit control interposed in said adjustment circuit, said pressure transducer registers pressure of the hydraulic motor of said means for rotating and sends a signal to the electronic circuit control, said electronic circuit control monitors said signal and adjust an amount of fluid to the propelling hydraulic motor whereby rotation speed of the rotor and forward motion speed of the machine are self-adjusting and self-compensating such that a decrease in pressure in the hydraulic motor of the means for rotating causes an increase in forward motion speed of the crushing machine while an increase in pressure in the hydraulic motor of the means for rotating causes a decrease in forward motion speed of the crushing machine.

13. A mobile, self-propelled crushing machine comprising:

a support structure having two longitudinal, generally parallel beams supporting a central frame;

a rotor housed within the central frame;

means for moving the rotor generally orthogonally to the generally parallel beams in order to raise and lower the rotor;

a series of flanges and spacers provided on the rotor, said flanges being separated from one another by the spacers;

hammers detachably affixed to the flanges on the rotor;

means for rotating the rotor, said means for rotating being operatively connected to the rotor and including at least one hydraulic motor;

a propelling hydraulic motor for driving the crushing machine at a forward motion speed; and control means for self-adjusting and self-compensating the forward motion speed and rotation speed of the rotor, said control means comprising;

an adjustment circuit interconnecting the hydraulic motor of the means for rotating with the propelling hydraulic motor, a pressure transducer interposed in said adjustment circuit, said pressure transducer registers pressure of the hydraulic motor of said means for rotating and outputs a signal in response thereto, and an electronic circuit control operatively connected to said pressure transducer, said circuit control receives said signal and adjusts an amount of fluid to the propelling hydraulic motor, whereby a decrease in pressure in the hydraulic motor of the means for rotating causes an increase in forward motion speed of the crushing machine while an increase in pressure in the hydraulic motor of the means for rotating causes a decrease in forward motion speed of the crushing machine.

* * * * *